3,254,089
CATALYTIC PROCESS FOR PREPARING PYRIDINE
John Anthony Corran and Alan Thomas Smith Mitchell, Widnes, England, assignors to Imperial Chemical Industries Limited, Millbank, London, England, a corporation of Great Britain
No Drawing. Filed Feb. 18, 1963, Ser. No. 259,413
Claims priority, application Great Britain, Feb. 21, 1962, 6,739/62
5 Claims. (Cl. 260—290)

This invention relates to a catalytic process, more particularly for the manufacture of pyridine.

It is known to make pyridine by passing a mixture of tetrahydrofurfuryl alcohol and ammonia over a heated catalyst. Catalysts which may be used in this process include simple oxides such as alumina and chromium oxide and also mixed oxides, for example a mixture of cobalt oxide, molybdena and alumina as described in U.S. Patent No. 2,963,484. In using these catalytic processes it is not sufficient for the catalyst to produce a high conversion of tetrahydrofurfuryl alcohol to the desired pyridine product, but it is also important for the catalyst to have a sufficiently long active life. Many catalysts, including those mentioned above, have a marked tendency to accumulate carbonaceous deposits which diminish the activity of the catalyst so that it is necessary for the catalyst to be regenerated at frequent intervals by burning out the carbonaceous material in air or oxygen. For economical success of the process, therefore, a catalyst should combine as far as possible a high conversion efficiency and low coke-forming properties.

It has now been found that a very suitable catalyst is a mixture of zinc oxide, molybdenum oxide and alumina. The zinc oxide and molybdenum oxide may be present in these catalysts as zinc molybdate. Using this catalyst, the rate of coke-formation is low and the process can be operated for longer periods before it becomes necessary to regenerate the catalyst. Also, the burning of carbonaceous matter in the regeneration of this catalyst is easily regulated.

Thus according to the present invention there is provided a process for the manufacture of pyridine which comprises passing a mixture of tetrahydrofurfuryl alcohol and ammonia in the vapour phase at elevated temperature over a catalyst containing zinc oxide, molybdenum oxide and alumina.

The catalyst may be in a finely divided form or may be pelleted before use, and may be made for example by mixing aqueous solutions of ammonium molybdate and a zinc salt in the presence of alumina and then evaporating the mixture to dryness and igniting it. It is preferred to use a zinc salt, for example the nitrate, which is converted to the oxide on ignition in air or oxygen. The proportion of zinc and molybdenum oxides together is preferably from 1% to 20% of the catalyst by weight, the remainder being alumina; smaller proportions tend to give a catalyst of low activity and higher proportions may lead to brittleness in pelleted forms of the catalyst.

The proportions of ammonia and tetrahydrofurfuryl alcohol which may be used can be varied considerably. In general, the proportion should be between 1 and 10 molecular proportions of ammonia for each molecular proportion of tetrahydrofurfuryl alcohol, as larger proportions do not tend to produce any additional increase in the yield of pyridine but may require expensive recovery, and smaller proportions tend to decrease the efficiency of conversion of tetrahydrofurfuryl alcohol to pyridine. In particular it is preferred to use the ammonia and tetrahydrofurfuryl alcohol in a molar ratio of about 5:1 (i.e. about 8.5 parts of ammonia to 10 parts of tetrahydrofurfuryl alcohol by weight). The rate of flow through the catalyst can be varied widely and in particular liquid hourly space velocities of 0.01 to 5 may be used. In general, high rates of throughput result in less of the tetrahydrofurfuryl alcohol being converted to carbonaceous matter on the catalyst and lower conversions of tetrahydrofurfuryl alcohol to pyridine while at lower space velocities the yields of pyridine are higher but the proportion of carbon deposited on the catalyst is greater.

The reaction temperature used may be in particular between 450° C. and 600° C. and is preferably between 500° C. and 525° C. Higher temperatures tend to increase carbon formation and lower the yields of pyridine. It is usually most convenient to operate the process by vaporising tetrahydrofurfuryl alcohol at the desired rate, mixing the vapour with the desired proportion of ammonia, heating the mixture and passing it through a bed of catalyst particles or granules in a reaction vessel which is maintained at the requisite reaction temperature by external heating. An inert carrier gas such as nitrogen or steam may also be mixed with the vapour stream to be passed over the catalyst, and this improves the efficiency of the process, particularly when the inert gas is steam.

The reaction proceeds satisfactorily at substantially atmospheric pressure and there is no noticeable advantage in using greater or lower pressures, though these may be used if desired.

The vapours emerging from the catalyst may be condensed and worked up to recover the pyridine using conventional techniques, for example fractional distillation, treatment with caustic soda, or combinations of such techniques. Conveniently, pyridine may be separated as a water azeotrope, by a combination of steam distillation and fractionation, and this azeotrope can then be dehydrated, for example by distillation with benzene. Any unchanged tetrahydrofurfuryl alcohol recovered may be re-used.

The process of the present invention enables pyridine to be manufactured from tetrahydrofurfuryl alcohol by a continuously operating process with less interruption for regeneration than was necessary hitherto. When the catalyst activity becomes reduced to an uneconomic level by accumulation of carbonaceous material, the carbonaceous material can be burnt out by heating the catalyst in a stream of air or oxygen at elevated temperature, particularly between 400° C. and 550° C., and the activity of the catalyst can be thus recovered. The temperature used for this regeneration preferably should not exceed 600° C., and steam or nitrogen may be mixed with the air or oxygen to accelerate the rate of carbon removal and minimise variations in temperature. Repetition of the cycle of use and regeneration can be repeated.

The process of the present invention can be carried out using a static catalyst or using a fluidised bed technique, in which the catalyst particles are circulated while suspended in the reactant vapours. This fluidised bed technique has the advantage of easier temperature control, more nearly uniform catalyst temperature, longer periods of operation between successive regeneration steps, improved yields of pyridine, and an increase in the ratio of production time to regeneration time in operation. The overall advantages of using the fluidised catalyst are unexpectedly great, and this method of operation is preferred.

The invention is illustrated but not limited by the following examples in which the parts and percentages are by weight.

*Example 1*

197 parts of ammonium molybdate are dissolved in a hot mixture of 70 parts of aqueous ammonia solution (specific gravity 0.880) and 200 parts of water. This solution is mixed with 1008 parts of alumina which has previously been calcined at 450° C. for 5 hours. An aqueous solution of 118.5 parts of zinc nitrate hexahydrate in 222 parts of water is then added and the whole is thoroughly mixed, dried at 105° C., and calcined for 4 hours at 450° C. The calcined solid is crushed and graded to a particle size of between 76 and 152 microns. Analysis of this catalyst shows it to contain 9.0±0.1% molybdenum and 2.2±0.1% zinc. Before use for pyridine production, the catalyst is heated to 520° C. and purged for 2 hours in a stream of nitrogen, 30 minutes in a stream of hydrogen and finally 10 minutes in a stream of ammonia.

122 parts of a catalyst made as described above is used in the form of a fluidised bed in a reactor tube of 1.2 inches internal diameter provided with a central thermocouple pocket and heated in an electrical resistance furnace. The unexpanded depth of catalyst is 6 inches A mixture of 84.2 grams of tetrahydrofurfuryl alcohol and 71.7 grams of ammonia is passed through the reactor during a period of 2 hours while the main body of the catalyst is kept at 520° C. The reaction products emerging from the reactor are condensed, and are found by gas-liquid chromatographic analysis to contain 36.9 grams of pyridine (equivalent to a 56% yield based on the tetrahydrofurfuryl alcohol used) and 1.8 grams of dihydropyran. The catalyst so used is contaminated by 4.2 grams of carbon.

*Example 2*

The procedure of Example 1 is repeated, except that a mixture of 73.9 grams of tetrahydrofurfuryl alcohol, 13.0 grams of water and 61.3 grams of ammonia is passed through the fluidised catalyst during a period of 2 hours while the main body of the catalyst is maintained at 520° to 530° C. The resulting reaction products are found to contain 35.1 parts of pyridine (equivalent to a 61% yield based on the tetrahydrofurfuryl alcohol used) and 1.3 grams of dihydropyran. The catalyst so used contains 3.5 grams of carbon.

*Example 3*

Tetrahydrofurfuryl alcohol is passed for 8 hours at a liquid hourly space velocity of 1.0, in admixture with 5 moles of ammonia for each mole of tetrahydrofurfuryl alcohol, through a static catalyst bed maintained at 525° C. and made up of a pelleted form of a zinc molybdate/alumina catalyst (containing 10 parts of zinc molybdate to 90 parts of gamma-alumina) prepared in the manner described in Example 1. The vapours emerging from the catalyst are condensed, and the condensate is found by gas/liquid chromatographic analysis to contain pyridine equivalent to 47% yield based on the tetrahydrofurfuryl alcohol used. The carbon deposited on the catalyst is equivalent to 1.9% of the tetrahydrofurfuryl alcohol used.

On repetition of the procedure of this example using tetrahydrofurfuryl alcohol at a liquid hourly space velocity of 0.5, a yield of pyridine equivalent to 55% based on the tetrahydrofurfuryl alcohol used is obtained, the carbon deposition is equivalent to 2.6% of the tetrahydrofurfuryl alcohol used.

*Example 4*

A mixture of tetrahydrofurfuryl alcohol vapour with 5 molar proportions of ammonia was passed at a linear gas velocity of 0.21 foot sec. (6.4 cm./sec.) and a contact time of approximately 9 seconds through a fluidised bed of 335 grams of zinc molybdate/alumina catalyst (containing 9.0% molybdenum and 2.2% zinc), maintained at 510–520° C. and contained in a glass reactor tube 4 cm. diameter and 75 cm. long. The reaction was continued until the catalyst contained 15% by weight of carbon, after which time reaction was stopped, the reactor tube and catalyst were purged with nitrogen, and the catalyst was regenerated by passage of air through the system while the catalyst bed was maintained at 510–520° C. The system was then purged again with nitrogen, the catalyst was heated in hydrogen and ammonia for a short period at reaction temperature. Sufficient fresh catalyst was added to replace the small amounts of catalyst lost, and the catalyst was then used for a further reaction cycle. This procedure was repeated, the reaction and regeneration cycles being summarised as follows:

|  | Reaction Time, hours | Regeneration Time, hours |
| --- | --- | --- |
| Run 1 | 62 | 15 |
| Run 2 | 30 | 6 |
| Run 3 | 39 | 10 |
| Run 4 | 38 | 12 |

As the yield of pyridine varies with the time for which the catalyst has been in use, the efficiency of the catalyst was assessed in terms of the average pyridine yield (based on the THFA) over approximately the first half of the life of the catalyst. The results were:

|  | Approx. half life, hours | Average pyridine yield, percent |
| --- | --- | --- |
| Run 1 | 32 | 60.8 |
| Run 2 | 15 | 55.3 |
| Run 3 | 21 | 61.2 |
| Run 4 | 20 | 60.8 |

What we claim is:

1. A process for the preparation of pyridine which comprises passing a mixture of tetrahydrofurfuryl alcohol and ammonia in a molar ratio of between 1:1 and 1:10 and in the vapor phase through a fluidized bed of a catalyst consisting essentially of zinc oxide, molybdenum oxide and alumina in which the proportion of zinc and molybdenum oxides together comprises from 1 to 20% by weight of the catalyst, said mixture being passed through the catalyst bed at a temperature between 450° C. and 600° C.

2. Process as claimed in claim 1 wherein an inert carrier gas is mixed with the vapour stream to be passed over the catalyst.

3. Process as claimed in claim 1 wherein the temperature used is between 500° C. and 525° C. and the molar ratio of ammonia and tetrahydrofurfuryl alcohol is about 5:1.

4. A process for the manufacture of pyridine which comprises passing a mixture of tetrahydrofurfuryl alcohol and ammonia in a molar ratio of about 1:5 and in the vapor phase over a catalyst consisting essentially of zinc oxide, molybdenum oxide and alumina in which the proportion of zinc and molybdenum oxides together comprises from 1–20% by weight of the catalyst, said mixture of alcohol and ammonia being passed over the catalyst at a temperature between 500° and 525° C. and atmospheric pressure.

5. The process of claim 4 wherein the catalyst is regenerated by heating in the presence of oxygen at a temperature between 400° C. and 600° C.

References Cited by the Examiner

UNITED STATES PATENTS

| 2,543,424 | 2/1951 | Spillane et al. | 260—290 |
| 2,963,484 | 12/1960 | Denton | 260—290 |
| 2,972,615 | 2/1961 | Denton | 260—290 |
| 2,972,616 | 2/1961 | Denton | 260—290 |
| 3,163,652 | 12/1964 | Manly et al. | 260—293.2 |

WALTER A. MODANCE, *Primary Examiner.*

NICHOLAS S. RIZZO, *Examiner.*

MARION W. WESTERN, J. M. FORD,
*Assistant Examiners.*